United States Patent Office 3,473,406
Patented Oct. 21, 1969

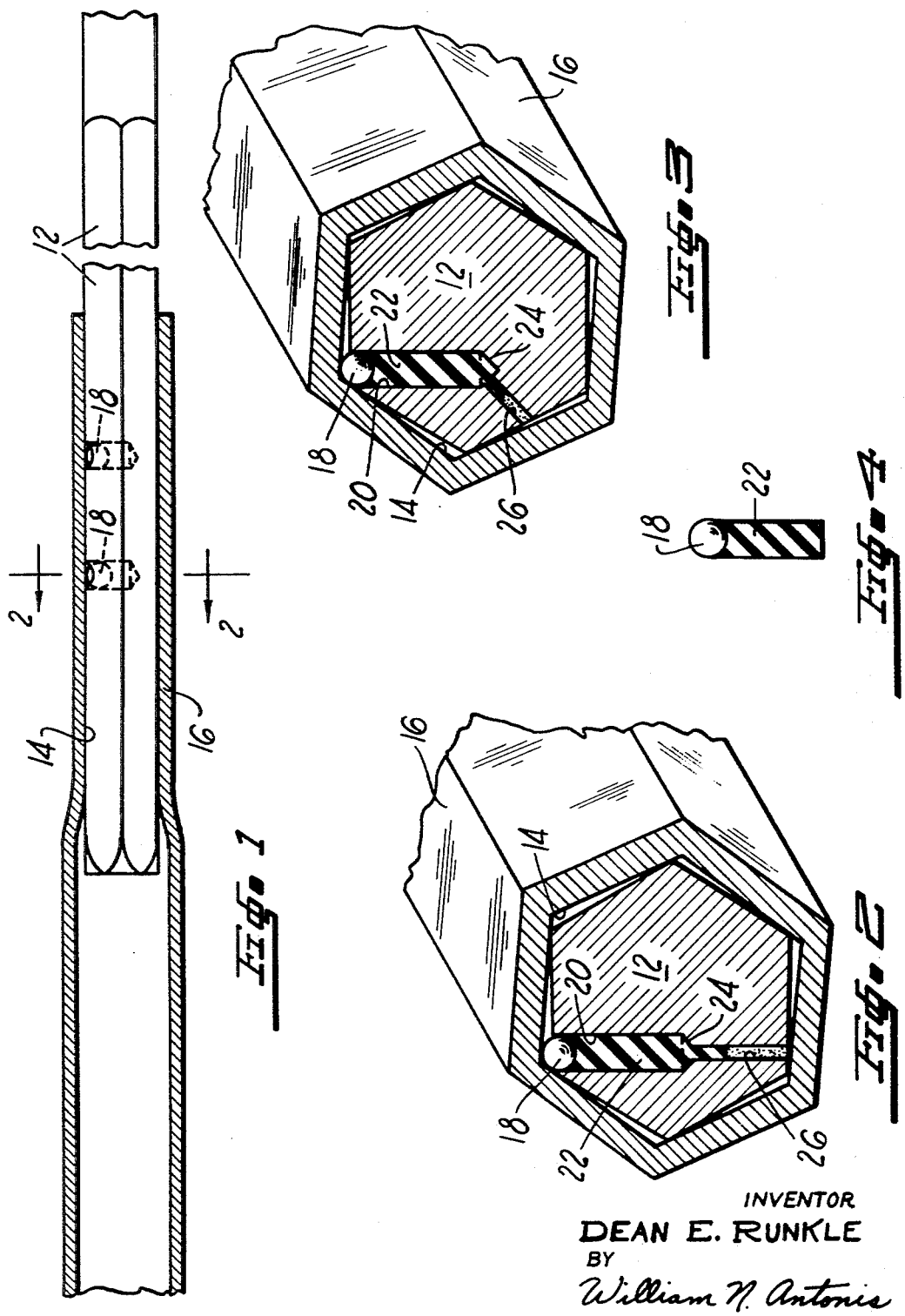

3,473,406
NO-LASH AXIALLY MOVABLE STEERING COLUMN
Dean E. Runkle, South Bend, Ind., assignor to The Bendix Corporation, a corporation of Delaware
Filed Mar. 11, 1968, Ser. No. 712,200
Int. Cl. B62d 1/18
U.S. Cl. 74—493                                6 Claims

ABSTRACT OF THE DISCLOSURE

The following relates to a steering column arrangement having two telescoping shafts, the first of which has a polygonal shape and the second of which has a corresponding polygonal bore for receiving the first shaft. A preloaded ball protrudes from one of the shafts and engages the adjacent polygonal surface of the other shaft at an off-center location to cause relative rotation and frictional engagement between the two shafts, thereby taking up rotational play and preventing subsequent uncontrolled relative rotation between the shafts. In order to permit the column to collapse only at forces above a predetermined value, the ball preload, which is provided by a rubber block located in a cavity, is controlled by the size of a drilled passage which extends from the cavity for venting the base thereof and permitting the rubber to extrude therein.

BACKGROUND OF THE INVENTION

In my earlier-issued U.S. Patent No. 3,318,170, which also related to a lash-free axially movable steering column for use on a driver-operated motor vehicle, the torsional lash was eliminated from two polygonal telescoping shafts of the steering column by utilizing a plurality of spring loaded members located in one of the shafts which abutted a polygonal surface of the other shaft at a location off center of the abutting polygonal surface to cause rotation and continuous frictional engagement of one of the shafts with respect to the other of the shafts, thereby eliminating torsional lash therebetween. In one of the simpler and less expensive embodiments, the spring load was provided by utilizing a rubber block, or other elastomer, in a blind bore behind a force transmitting member, such as a ball or cylindrical roller. In such installations, it oftentimes was difficult to achieve the desired preload because the tolerance stack of the inner shaft, the bore of the outer shaft, and the drill depth could vary, and as a consequence could affect the torsional deflection between and force required to collapse the telescoping shafts. It was further discovered that, even if the tolerance stack was within predetermined specified limits, the desired preload was not always achieved because air pockets developed under the rubber block, or grease was trapped thereunder, so that, in effect, the volume of the bore cavity in which the rubber block was located was reduced.

SUMMARY OF THE INVENTION

Accordingly, in view of the foregoing, it is an object of this invention to provide a collapsible steering column having inner and outer telescoping shafts wherein the foregoing tolerance stack and associated problems are eliminated.

Another object of this invention is to provide a lash-free telescoping steering column of the type described wherein the elastomeric preload is controlled by a passage extending from the bore cavity which permits trapped air and grease under the elastomeric material to be forced out the other side of the shaft.

A further object of this invention is to provide a lash-free telescoping steering column with vent passage means, of the type described, which prevents the extrusion of the elastomeric material around the force transmitting member and subsequent general deterioration thereof by permitting excess elastomeric material to be extruded into the vent passage without reducing the preload exerted thereby.

An important object of this invention is to provide a lash-free collapsible steering column with a vent passage, of the type described, wherein the preload of the elastomeric material is inversely proportional to the cross-sectional area of the vent passage and is uniformly predictable for a given bore depth and volume of elastomeric material.

Another object of this invention is to provide a lash-free telescoping steering column which will collapse when it is subject to axial forces above a predetermined value.

The above and other objects and features of this invention will become apparent from the following description taken in connection with the accompanying drawing.

BRIEF DESCRIPTION OF THE DRAWING

FIGURE 1 is a sectional view of a portion of a steering column of a vehicle showing the axially movable components thereof and the invention relating thereto;

FIGURE 2 is an enlarged, somewhat exaggerated, isometric sectional view taken along line 2—2 of FIGURE 1;

FIGURE 3 is an isometric sectional view similar to FIGURE 2 showing a modification of the invention; and FIGURE 4 is a plan view of the force transmitting member bonded to a rubber block to form a unitary element.

DESCRIPTION OF THE PREFERRED EMBODIMENT

Referring to the drawing, it will be seen that a shaft 12 having a hexagonal shape is located in a corresponding hexagonal bore 14 formed in a shaft 16. One of the shafts is suitably connected to the steering wheel (not shown) of a vehicle, whereas the other of said shafts is suitably connected to the steering gear (not shown) of the vehicle. If needed, it will be understood that a universal joint of the type disclosed in my U.S. Patent No. 3,296,830, issued Jan. 10, 1967, can be interposed between the steering wheel and the shaft connected thereto and/or the steering gear and the shaft connected thereto. Because of the telescopic arrangement between shafts 12 and 16, it will be apparent that axial adjustment of the vehicle steering wheel can be accomplished simply by pushing or pulling on the steering wheel. Furthermore, in the event of an accident, injury to the driver will be minimized because the steering column can telescope or collapse upon impact.

Since it is impractical from a tolerance standpoint to make the telescoping shafts 12 and 16 lash free, force transmitting members, such as balls 18, are located in bores 20. The balls are placed under a predetermined preload and are urged radially outwardly by suitable elastomeric material, such as rubber blocks 22 which are located between the balls 18 and shoulders 24 of the bores. The preloaded balls, which protrude from a polygonal surface of one of the shafts into abutment with a polygonal surface of the other of said shafts at a location off center of the abutting polygonal surface, cause relative rotation and frictional engagement between the two shafts and permit relative axial movement therebetween only upon the occurrence of axial forces above a predetermined value.

In order to eliminate substantial variations in the preload exerted by the rubber block a drilled passage 26, which extends from the base of the bore, is utilized to permit the escape of trapped air and/or grease from beneath the rubber block. In addition, this vent passage 26 prevents excess rubber from extruding around the ball by permitting it to extrude into the passage. More importantly, the use of a vent passage allows a greater tolerance range on the bore depth and rubber block size and provide a more accurate predictability of the preload exerted by the rubber block since the preload of the rubber block is inversely proportional to the cross-sectional area of the vent passage. Stated differently, the force to collapse the steering column is inversely proportional to the diameter of the drilled vent passage 26.

Thus, tests have shown that, for a given bore depth and rubber block size, the force required to collapse the steering column decreased as the diameter of the vent passage was increased, as set forth below.

| Vent diameter, in.: | Collapse force, lbs. |
|---|---|
| .078 | 600 |
| .089 | 400 |
| .095 | 200 |

Although FIGURE 2 shows the rubber block cavity and vent passage as a stepped diameter bore, it will be understood that the vent passage could extend from the cavity in some other suitable fashion, such as that which is is hown in FIGURE 3. In addition although separate balls and rubber blocks can be utilized, it has been found that, when the ball is bonded to the rubber block, as shown in FIGURE 4, this arrangement has beeter functional characteristics for compression set over the separate ball and rubber block. Furthermore, the unitary ball and rubber block reduces assembly costs since the ball need not be staked in place.

The several practical advantages which flow from this type of an adjustable and/or collapsible steering column arrangement are believed to be obvious from the above, and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. For example, shafts having shapes and corresponding bores other than hexagonal would be suitable in the practice of this invention.

Having thus described the various features of the invention, what I claim as new and desire to secure by Letters Patent is:

1. An axially movable column comprising inner and outer shafts, one of which is axially movable with respect to the other of said shafts, said inner shaft having a polygonal shape and said outer shaft having a corresponding polygonal bore therein for receiving said inner shaft, and preloaded means operatively connected to said inner and outer shafts for causing rotation and continuous frictional engagement of one of said shafts with respect to the other of said shafts to thereby eliminate torsional lash therebetween and permit relative axial movement therebetween only upon the occurrence of axial forces above a predetermined value, said preloaded means comprising a cavity located in one of said shafts and having a shoulder formed in the base thereof, a force transmitting member located in said cavity and protruding from a polygonal surface of one of said shafts into abutment with a polygonal surface of the other of said shafts at a location off center of the abutting polygonal surface, an elastomeric preloaded material located within said cavity between said force transmitting member and said shoulder for urging said member against said abutting polygonal surface, and means for controlling the preload of said elastomeric material, said means including a passage extending from said cavity for venting the base thereof and permitting said elastomeric material to extrude therein.

2. The strecture, as defined in claim 1, wherein said cavity has a larger cross-sectional area than said passage.

3. The structure, as defined in claim 2, wherein said cavity and said passage comprise a stepped diameter bore located in one of said shafts.

4. The structure, as defined in claim 3, wherein said stepped diameter bore is located in and extends through said inner shaft.

5. The structure, as defined in claim 4, wherein said force transmitting member is spherical and said elastomeric material is a rubber block.

6. The structure, as defined in claim 5, wherein said spherical force transmitting member is bonded to said rubber block to form a unitary element.

References Cited
UNITED STATES PATENTS

| 2,973,214 | 2/1961 | Bates et al. | 287—126 |
| 3,318,170 | 5/1967 | Runkle | 74—493 |

MILTON KAUFMAN, Primary Examiner

U.S. Cl. X.R.

64—23; 287—126